(12) United States Patent
Wang et al.

(10) Patent No.: US 12,281,247 B2
(45) Date of Patent: Apr. 22, 2025

(54) MULTILAYER PROTECTIVE FILM

(71) Applicant: SAINT-GOBAIN PERFORMANCE PLASTICS CORPORATION, Solon, OH (US)

(72) Inventors: Yongzhong Wang, Tucson, AZ (US); Matthew Gacek, Boerne, TX (US); Tad Bergstresser, Poway, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 199 days.

(21) Appl. No.: 18/065,226

(22) Filed: Dec. 13, 2022

(65) Prior Publication Data
US 2023/0193083 A1 Jun. 22, 2023

Related U.S. Application Data

(60) Provisional application No. 63/265,751, filed on Dec. 20, 2021.

(51) Int. Cl.
*C09J 7/25* (2018.01)
*C09J 7/40* (2018.01)
(Continued)

(52) U.S. Cl.
CPC ............. *C09J 7/255* (2018.01); *C09J 7/403* (2018.01); *C09J 133/08* (2013.01); *C09J 183/04* (2013.01);
(Continued)

(58) Field of Classification Search
CPC . C09J 7/255; C09J 7/403; C09J 133/08; C09J 183/04; C09J 2301/124;
(Continued)

(56) References Cited

U.S. PATENT DOCUMENTS 9,459,386 B2 10/2016 Hebrink et al.
2011/0229703 A1* 9/2011 Hayata ............... C09J 7/385
428/355 AC
(Continued)

FOREIGN PATENT DOCUMENTS

CN 208745473 A 4/2019
CN 209700000 U 11/2019
(Continued)

OTHER PUBLICATIONS

International Search Report and Written Opinion for PCT Application No. PCT/US2022/081423, dated Apr. 26, 2023, 10 pages.

*Primary Examiner* — Patricia L. Nordmeyer
(74) *Attorney, Agent, or Firm* — Abel Schillinger, LLP; Chi Suk Kim

(57) ABSTRACT

The present disclosure related to a multilayer protective film that may include a structural PET layer, a first removable adhesive layer underlying the structural PET layer, a first peelable adhesive layer overlying the structural PET layer, a first flame retardant PET layer overlying the first peelable adhesive layer, a second peelable adhesive layer overlying the first flame retardant PET layer, and a second flame retardant PET layer overlying the second peelable adhesive layer. The multilayer protective film may have a lateral flame spread of at least about 20 KW/m², a specific optical density (Ds) of not greater than about 300, and a cumulative specific optical density (VOF₄) of not greater than about 600.

20 Claims, 3 Drawing Sheets

(51) Int. Cl.
*C09J 133/08* (2006.01)
*C09J 183/04* (2006.01)

(52) U.S. Cl.
CPC .... *C09J 2301/124* (2020.08); *C09J 2301/208* (2020.08); *C09J 2301/312* (2020.08); *C09J 2301/502* (2020.08); *C09J 2467/006* (2013.01)

(58) Field of Classification Search
CPC ............ C09J 2301/208; C09J 2301/312; C09J 2301/502; C09J 2467/006; C09J 2433/00; C09J 7/29; C09J 2483/00
See application file for complete search history.

(56) References Cited

U.S. PATENT DOCUMENTS

| | | | |
|---|---|---|---|
| 2014/0065397 A1 | 3/2014 | Johnson et al. | |
| 2015/0359675 A1* | 12/2015 | Wilson | B32B 27/365 2/431 |
| 2016/0023442 A1* | 1/2016 | Faris | B32B 27/40 428/447 |

FOREIGN PATENT DOCUMENTS

| | | |
|---|---|---|
| CN | 210443125 U | 5/2020 |
| CN | 109572128 A | 10/2020 |
| EP | 3120998 A1 | 1/2017 |
| JP | 5607574 B2 | 10/2014 |
| WO | 2006044375 A2 | 4/2006 |
| WO | 2023122447 A1 | 6/2023 |

\* cited by examiner

MULTILAYER PROTECTIVE FILM

CROSS-REFERENCE TO RELATED APPLICATION(S)

This application claims priority under 35 U.S.C. § 119(e) to U.S. Provisional Patent Application No. 63/265,751, entitled "MULTILAYER PROTECTIVE FILM," by Yongzhong WANG et al., filed Dec. 20, 2021, which is entitled to the current assignee hereof and is incorporated herein by reference in its entirety.

FIELD OF THE DISCLOSURE

The present disclosure relates to a multilayer protective film and methods of forming the same.

BACKGROUND

Multilayer protective films are generally designed for application and protection of a particular surface. However, after application of the protective film to the surface, imperfections can appear in the protective film due to delamination, diminishing the overall appearance of the covered surface. Accordingly, multilayer protective films that show improved installation performance and that maintain their improved protection through multiple layers of the film are desired.

SUMMARY

According to a first aspect, a multilayer protective film may include a structural PET layer, a first removable adhesive layer underlying the structural PET layer, a first peelable adhesive layer overlying the structural PET layer, a first flame retardant PET layer overlying the first peelable adhesive layer, a second peelable adhesive layer overlying the first flame retardant PET layer, and a second flame retardant PET layer overlying the second peelable adhesive layer. The multilayer protective film may have a lateral flame spread of at least about 20 KW/m$^2$. The multilayer protective film may further have a specific optical density (Ds[4]) of not greater than about 300. The multilayer protective film may further have a cumulative specific optical density (VOF$_4$) of not greater than about 600.

According to another aspect, a multilayer protective film may include a first flame retardant PET layer, a first removable adhesive layer underlying the first flame retardant PET layer, a first peelable adhesive layer overlying the first flame retardant PET layer, a structural PET layer overlying the first peelable adhesive layer, a second peelable adhesive layer overlying the structural PET layer, and a second flame retardant PET layer overlying the second peelable adhesive layer. The multilayer protective film may have a lateral flame spread of at least about 20 KW/m$^2$. The multilayer protective film may further have a specific optical density (Ds[4]) of not greater than about 300. The multilayer protective film may further have a cumulative specific optical density (VOF$_4$) of not greater than about 600.

According to still another aspect, a multilayer protective film may include a first flame retardant PET layer, a first removable adhesive layer underlying the first flame retardant PET layer, a first peelable adhesive layer overlying the first flame retardant PET layer, a second flame retardant PET layer overlying the first peelable adhesive layer, a second peelable adhesive layer overlying the second flame retardant PET layer, and a structural PET layer overlying the second peelable adhesive layer. The multilayer protective film may have a lateral flame spread of at least about 20 KW/m$^2$. The multilayer protective film may further have a specific optical density (Ds[4]) of not greater than about 300. The multilayer protective film may further have a cumulative specific optical density (VOF$_4$) of not greater than about 600.

According to still another aspect, a method of forming a multilayer protective film may include providing a structural PET layer, forming a first removable adhesive layer underlying the structural PET layer, forming a first peelable adhesive layer overlying the structural PET layer, providing a first flame retardant PET layer overlying the first peelable adhesive layer, forming a second peelable adhesive layer overlying the first PET layer, and providing a second flame retardant PET layer overlying the second peelable adhesive layer. The multilayer protective film may have a lateral flame spread of at least about 20 KW/m$^2$. The multilayer protective film may further have a specific optical density (Ds[4]) of not greater than about 300. The multilayer protective film may further have a cumulative specific optical density (VOF$_4$) of not greater than about 600.

According to another aspect, a method of forming a multilayer protective film may include providing a first flame retardant PET layer, forming a first removable adhesive layer underlying the first flame retardant PET layer, forming a first peelable adhesive layer overlying the first flame retardant PET layer, providing a structural PET layer overlying the first peelable adhesive layer, forming a second peelable adhesive layer overlying the structural PET layer, and providing a second flame retardant PET layer overlying the second peelable adhesive layer. The multilayer protective film may have a lateral flame spread of at least about 20 KW/m$^2$. The multilayer protective film may further have a specific optical density (Ds[4]) of not greater than about 300. The multilayer protective film may further have a cumulative specific optical density (VOF$_4$) of not greater than about 600.

According to still another aspect, a method of forming a multilayer protective film may include providing a first flame retardant PET layer, forming a first removable adhesive layer underlying the first flame retardant PET layer, forming a first peelable adhesive layer overlying the first flame retardant PET layer, providing a second flame retardant PET layer overlying the first peelable adhesive layer, forming a second peelable adhesive layer overlying the second flame retardant PET layer, and providing a structural PET layer overlying the second peelable adhesive layer. The multilayer protective film may have a lateral flame spread of at least about 20 KW/m$^2$. The multilayer protective film may further have a specific optical density (Ds[4]) of not greater than about 300. The multilayer protective film may further have a cumulative specific optical density (VOF$_4$) of not greater than about 600.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a multilayer protective film that includes a structural PET layer, at least two flame retardant PET layers and peelable adhesive layers connecting the substrates. The combination of the two different types of PET substrate may provide improved performance of the multilayer protective film.

Figure 1:
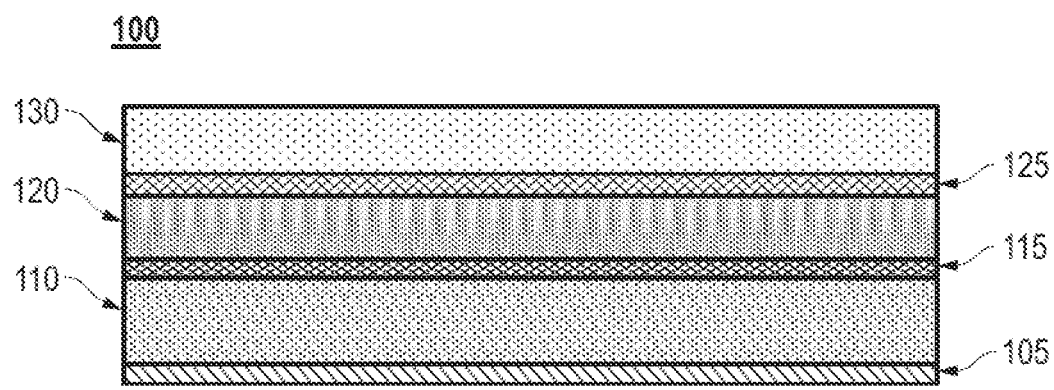
FIG. 1 includes an illustration of a multilayer protective film according to embodiments described herein.

For purposes of illustration, FIG. 1 includes an illustration of a multilayer protective film 100 according to embodiments described herein. As shown in FIG. 1, a multilayer protective film 100 may include a structural PET layer 110, a first removable adhesive layer 105 underlying the structural PET layer 110, a first peelable adhesive layer 115 overlying the structural PET layer 110, a first flame retardant PET layer 120 overlying the first peelable adhesive layer 115, a second peelable adhesive layer 125 overlying the first flame retardant PET layer 120, and a second flame retardant PET layer 130 overlying the second peelable adhesive layer 125.

According to certain embodiments, the multilayered protective film 100 may have a lateral flame spread as measured by ISO 5658-2. For example, the multilayered protective film 100 may have a lateral flame spread of at least about 20 KW/m$^2$, such as, at least about 25 KW/m$^2$ or at least about 30 KW/m$^2$ or at least about 35 KW/m$^2$ or at least about 40 KW/m$^2$ or at least about 45 KW/m$^2$ or even at least about 50 KW/m$^2$. It will be appreciated that the lateral flame spread of the multilayered protective film 100 may be within a range between any of the minimum and maximum values noted above. It will be further appreciated that the lateral flame spread of the multilayered protective film 100 may be any value between any of the minimum and maximum values noted above.

According to certain embodiments, the multilayered protective film 100 may have a specific optical density (Ds[4]) as measured by ISO 5659-2. For example, the multilayered protective film 100 may have a specific optical density (Ds[4]) of not greater than about 300, such as, not greater than 290 or not greater than about 280 or not greater than about 270 or not greater than about 260 or not greater than about 250 or not greater than about 240 or not greater than about 230 or not greater than about 220 or not greater than about 210 or even not greater than about 200. It will be appreciated that the specific optical density (Ds[4]) of the multilayered protective film 100 may be within a range between any of the minimum and maximum values noted above. It will be further appreciated that the specific optical density (Ds[4]) of the multilayered protective film 100 may be any value between any of the minimum and maximum values noted above.

According to certain embodiments, the multilayered protective film 100 may have a cumulative specific optical density (VOF$_4$) as measured by ISO 5659-2. For example, the multilayered protective film 100 may have a cumulative specific optical density (VOF$_4$) of not greater than about 600, such as, not greater than about 590 or not greater than about 580 or not greater than about 570 or not greater than about 560 or not greater than about 550 or not greater than about 540 or not greater than about 530 or not greater than about 520 or not greater than about 510 or even not greater than about 500. It will be appreciated that the cumulative specific optical density (VOF$_4$) of the multilayered protective film 100 may be within a range between any of the minimum and maximum values noted above. It will be further appreciated that the cumulative specific optical density (VOF$_4$) of the multilayered protective film 100 may be any value between any of the minimum and maximum values noted above.

According to a particular embodiment, the multilayered protective film 100 may have a particular VLT as measured according to ASTM D1003. For example, the multilayered protective film 100 may have a VLT of at least about 88%, such as, at least about 89% or at least about 90% or at least about 91% or at least about 92% or even at least about 93%. According to still other embodiments, the multilayered protective film 100 may have a VLT of not greater than about 98%. It will be appreciated that the VLT of the multilayered protective film 100 may be within a range between any of the minimum and maximum values noted above. It will be further appreciated that the VLT of the multilayered protective film 100 may be any value between any of the minimum and maximum values noted above.

According to still other embodiments, the multilayered protective film 100 may have a particular haze value as measured according to ASTM D1003. For example, the multilayered protective film 100 may have a haze value of at least about 0.2%, such as, at least about 0.3% or at least about 0.4% or at least about 0.5% or at least about 0.6% or at least about 0.7% or at least about 0.8% or at least about 0.9% or even at least about 1.0%. According to still other embodiments, the multilayered protective film 100 may have a haze value of not greater than about 4.0%. It will be appreciated that the haze value of the multilayered protective film 100 may be within a range between any of the minimum and maximum values noted above. It will be further appreciated that the haze value of the multilayered protective film 100 may be any value between any of the minimum and maximum values noted above.

According to still other embodiments, the structural PET layer 110 may include polyethylene terephthalate (PET). According to still other embodiments, the structural PET layer 110 may consist of PET.

According to still other embodiments, the structural PET layer 110 may have a particular thickness. For example, the structural PET layer 110 may have a thickness of at least about 5 microns, such as, at least about 10 microns or at least about 20 microns or at least about 30 microns or at least about 40 microns or at least about 50 microns or even at least about 100 microns. According to still other embodiments, the first anti-microbial coating 120 may have an thickness of not greater than about 400 microns, such as, not greater than about 375 microns or not greater than about 350 microns or not greater than about 325 microns or not greater than about 300 microns or not greater than about 275 microns or not greater than about 250 microns or not greater than about 225 microns or even not greater than about 200. It will be appreciated that the average thickness of the structural PET layer 110 may be within a range between any of the minimum and maximum values noted above. It will be further appreciated that the average thickness of the structural PET layer 110 may be any value between any of the minimum and maximum values noted above.

According to still other embodiments, the first removable adhesive layer 105 may include particular materials. For example, the first removable adhesive layer 105 may include an acrylic-based adhesive, a silicone-based adhesive, a semi-permanent pressure sensitive adhesive, and combinations thereof. According to still other embodiments, the first removable adhesive layer 105 may consist essentially of particular materials. For example, the first removable adhesive layer 105 may consist essentially of an acrylic-based adhesive, a silicone-based adhesive, a semi-permanent pressure sensitive adhesive, and combinations thereof.

According to still other embodiments, the first removable adhesive layer 105 may have a particular thickness. For example the first removable adhesive layer 105 may have a thickness of at least about 2.5 microns, such as, at least about 3 microns or at least about 4 microns or at least about 5 microns or at least about 10 microns or at least about 15 microns or at least about 20 microns or at least about 25 microns or at least about 30 microns or at least about 35 microns or at least about 40 microns or even at least about 45 microns. According to yet other embodiments, the first removable adhesive layer 105 may have a thickness of not greater than about 100 microns, such as, not greater than about 95 microns or not greater than about 90 microns or not greater than about 85 microns or not greater than about 80 microns or not greater than about 75 microns or not greater than about 70 microns or not greater than about 65 microns or not greater than about 60 microns or even not greater than about 55 microns. It will be appreciated that the thickness of the first removable adhesive layer 105 may be within a range between any of the minimum and maximum values noted above. It will be further appreciated that the thickness of the first removable adhesive layer 105 may be any value between any of the minimum and maximum values noted above.

According to still other embodiments, the first removable adhesive layer 105 may have a particular peel strength as measured according to ASTM D903-98. According to particular embodiments, the first removable adhesive layer 105 may have a peel strength of at least about 25 g/in, such as, at least about 30 g/in or at least about 35 g/in or at least about 40 g/in or at least about 50 g/in or at least about 100 g/in or at least about 200 g/in or at least about 300 g/in or at least about 400 g/in or even at least about 500 g/in. According to still other embodiments, the first removable adhesive layer 105 may have a peel strength of not greater than about 2500 g/in, such as, not greater than about 2400 g/in or not greater than about 2300 g/in or not greater than about 2200 g/in or not greater than about 2100 g/in. It will be appreciated that the peel strength of first removable adhesive layer 105 of the multilayered protective film 100 may be within a range between any of the minimum and maximum values noted above. It will be further appreciated that the peel strength of the first removable adhesive layer 105 of the multilayered protective film 100 may be any value between any of the minimum and maximum values noted above.

According to yet other embodiments, the first removable adhesive layer 105 may further include a release liner underlying the first removable adhesive layer 105. According to certain embodiments, the release line may be a silicone-based layer.

According to still other embodiments, the release liner may have a particular thickness. For example, the release liner may have a thickness of at least about 5 microns, such as, at least about 10 microns or at least about 20 microns or at least about 30 microns or at least about 40 microns or at least about 50 microns or even at least about 60 microns. According to still other embodiments, the release liner may have a thickness or not greater than about 150 microns, such as, not greater than about 140 microns or not greater than about 130 microns or not greater than about 120 microns or not greater than about 110 microns or even not greater than about 100 microns. It will be appreciated that the thickness of the release liner may be within a range between any of the minimum and maximum values noted above. It will be further appreciated that the thickness of the release liner may be any value between any of the minimum and maximum values noted above.

According to still other embodiments, the first flame retardant PET layer 120 may include a PET base material and a flame retardant filler component within the PET base material.

According to still other embodiments, the first flame retardant PET layer 120 may include a particular content of the PET base material. For example, the first flame retardant PET layer 120 may include a PET base material content of at least about 90 wt. % for a total weight of the first flame retardant PET layer, such as, at least about 90.5 wt. % or at least about 91 wt. % or at least about 91.5 wt. % or at least about 92.0 wt. % or at least about 92.5 wt. % or at least about 93.0 wt. % or at least about 93.5 wt. % or at least about 94.0 wt. % or at least about 94.5 wt. % or even at least about 95.0 wt. %. According to still other embodiments, the first flame retardant PET layer 120 may include a PET base material content of not greater than about 99.9 wt. % for a total weight of the first flame retardant PET layer, such as, not greater than about 99.5 wt. % or not greater than about 99.0 wt. % or not greater than about 98.5 wt. % or not greater than about 98.0 wt. % or not greater than about 97.5 wt. % or not greater than about 97.0 wt. % or not greater than about 96.5 wt. % or not greater than about 9.0 wt. %. It will be appreciated that the PET base material content of the first flame retardant PET layer 120 may be within a range between any of the minimum and maximum values noted above. It will be further appreciated that the PET base material content of the first flame retardant PET layer 120 may be any value between any of the minimum and maximum values noted above.

According to still other embodiments, the first flame retardant PET layer 120 may include a particular content of the PET base material. For example, the first flame retardant PET layer 120 may include a Flame retardant filler component content of at least about 0.1 wt. % for a total weight of the first flame retardant PET layer, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or even at least about 5.0 wt. %. According to still other embodiments, the first flame retardant PET layer 120 may include a Flame retardant filler component content of not greater than about 10.0 wt. % for a total weight of the first flame retardant PET layer, such as, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. %. It will be appreciated that the Flame retardant filler component content of the first flame retardant PET layer 120 may be within a range between any of the minimum and maximum values noted above. It will be further appreciated that the Flame retardant filler component content of the first flame retardant PET layer 120 may be any value between any of the minimum and maximum values noted above.

According to yet other embodiments, the first flame retardant PET layer 120 may have a V-0 rating as measured according to UL94 flammability test.

According to still other embodiments, the first flame retardant PET layer 120 may have a particular thickness. For example, the first flame retardant PET layer 120 may have a thickness of at least about 5 microns, such as, at least about 10 microns or at least about 20 microns or at least about 30 microns or at least about 40 microns or at least about 50 microns or even at least about 100 microns. According to still other embodiments, the first anti-microbial coating 120 may have an thickness of not greater than about 400 microns, such as, not greater than about 375 microns or not greater than about 350 microns or not greater than about 325 microns or not greater than about 300 microns or not greater than about 275 microns or not greater than about 250 microns or not greater than about 225 microns or even not greater than about 200. It will be appreciated that the average thickness of the first flame retardant PET layer 120 may be within a range between any of the minimum and maximum values noted above. It will be further appreciated that the average thickness of the first flame retardant PET layer 120 may be any value between any of the minimum and maximum values noted above.

According to still other embodiments, the first peelable adhesive layer 115 may include particular materials. For example, the first peelable adhesive layer 115 may include a non-permanent adhesive, an acrylic-based adhesive, a silicone-based adhesive, a semi-permanent pressure sensitive adhesive, and combinations thereof. According to still other embodiments, the first peelable adhesive layer 115 may consist essentially of particular materials. For example, the first peelable adhesive layer 115 may consist essentially of a non-permanent adhesive, an acrylic-based adhesive, a silicone-based adhesive, a semi-permanent pressure sensitive adhesive, and combinations thereof.

According to still other embodiments, the first peelable adhesive layer 115 may have a particular thickness. For example, the first peelable adhesive layer 115 may have a thickness of at least about 3 microns, such as, at least about 4 microns or at least about 5 microns or at least about 10 microns or at least about 15 microns or at least about 20 microns or even at least about 25 microns. According to yet other embodiments, the first peelable adhesive layer 115 may have a thickness of not greater than about 50 microns, such as, not greater than about 45 microns or not greater than about 40 microns or not greater than about 35 microns or not greater than about 30 microns or even not greater than about 25 microns. It will be appreciated that the thickness of the first peelable adhesive layer 115 may be within a range between any of the minimum and maximum values noted above. It will be further appreciated that the thickness of the first peelable adhesive layer 115 may be any value between any of the minimum and maximum values noted above.

According to still other embodiments, the first peelable adhesive layer 115 may have a particular peel strength (between itself and any other layer) as measured according to ASTM D903-98 in a 180 degree peel. According to particular embodiments, the first peelable adhesive layer 115 may have a peel strength of at least about 25 g/in, such as, at least about 30 g/in or at least about 35 g/in or at least about 40 g/in or at least about 50 g/in or at least about 100 g/in or at least about 200 g/in or at least about 300 g/in or at least about 400 g/in or even at least about 500 Win. According to still other embodiments, the first peelable adhesive layer 115 may have a peel strength of not greater than about 1000 g/in, such as, not greater than about 950 g/in or not greater than about 900 g/in or not greater than about 850 g/in or not greater than about 800 g/in. It will be appreciated that the peel strength of first peelable adhesive layer 115 of the multilayered protective film 100 may be within a range between any of the minimum and maximum values noted above. It will be further appreciated that the peel strength of the first peelable adhesive layer 115 of the multilayered protective film 100 may be any value between any of the minimum and maximum values noted above.

According to still other embodiments, the second peelable adhesive layer 125 may include particular materials. For example, the second peelable adhesive layer 125 may include a non-permanent adhesive, an acrylic-based adhesive, a silicone-based adhesive, a semi-permanent pressure sensitive adhesive, and combinations thereof. According to still other embodiments, the second peelable adhesive layer 125 may consist essentially of particular materials. For example, the second peelable adhesive layer 125 may consist essentially of a non-permanent adhesive, an acrylic-based adhesive, a silicone-based adhesive, a semi-permanent pressure sensitive adhesive, and combinations thereof.

According to still other embodiments, the second peelable adhesive layer 125 may have a particular thickness. For example, the second peelable adhesive layer 125 may have a thickness of at least about 3 microns, such as, at least about 4 microns or at least about 5 microns or at least about 10 microns or at least about 15 microns or at least about 20 microns or even at least about 25 microns. According to yet other embodiments, the second peelable adhesive layer 125 may have a thickness of not greater than about 50 microns, such as, not greater than about 45 microns or not greater than about 40 microns or not greater than about 35 microns or not greater than about 30 microns or even not greater than about 25 microns. It will be appreciated that the thickness of the second peelable adhesive layer 125 may be within a range between any of the minimum and maximum values noted above. It will be further appreciated that the thickness of the second peelable adhesive layer 125 may be any value between any of the minimum and maximum values noted above.

According to still other embodiments, the second peelable adhesive layer 125 may have a particular peel strength (between itself and any other layer) as measured according to ASTM D903-98 in a 180 degree peel. According to particular embodiments, the second peelable adhesive layer 125 may have a peel strength of at least about 25 g/in, such as, at least about 30 Win or at least about 35 g/in or at least about 40 g/in or at least about 50 g/in or at least about 100 Win or at least about 200 g/in or at least about 300 g/in or at least about 400 g/in or even at least about 500 g/in. According to still other embodiments, the second peelable adhesive layer 125 may have a peel strength of not greater than about 1000 g/in, such as, not greater than about 950 Win or not greater than about 900 g/in or not greater than about 850 g/in or not greater than about 800 g/in. It will be appreciated that the peel strength of second peelable adhesive layer 125 of the multilayered protective film 100 may be within a range between any of the minimum and maximum values noted above. It will be further appreciated that the peel strength of the second peelable adhesive layer 125 of the multilayered protective film 100 may be any value between any of the minimum and maximum values noted above.

According to still other embodiments, the second flame retardant PET layer 130 may include a PET base material and a flame retardant filler component within the PET base material.

According to still other embodiments, the second flame retardant PET layer 130 may include a particular content of the PET base material. For example, the second flame retardant PET layer 130 may include a PET base material content of at least about 90 wt. % for a total weight of the first flame retardant PET layer, such as, at least about 90.5 wt. % or at least about 91 wt. % or at least about 91.5 wt. % or at least about 92.0 wt. % or at least about 92.5 wt. % or at least about 93.0 wt. % or at least about 93.5 wt. % or at least about 94.0 wt. % or at least about 94.5 wt. % or even at least about 95.0 wt. %. According to still other embodiments, the second flame retardant PET layer 130 may include a PET base material content of not greater than about 99.9 wt. % for a total weight of the first flame retardant PET layer, such as, not greater than about 99.5 wt. % or not greater than about 99.0 wt. % or not greater than about 98.5 wt. % or not greater than about 98.0 wt. % or not greater than about 97.5 wt. % or not greater than about 97.0 wt. % or not greater than about 96.5 wt. % or not greater than about 9.0 wt. %. It will be appreciated that the PET base material content of the second flame retardant PET layer 130 may be within a range between any of the minimum and maximum values noted above. It will be further appreciated that the PET base material content of the second flame retardant PET layer 130 may be any value between any of the minimum and maximum values noted above.

According to still other embodiments, the second flame retardant PET layer 130 may include a particular content of the PET base material. For example, the second flame retardant PET layer 130 may include a Flame retardant filler component content of at least about 0.1 wt. % for a total weight of the first flame retardant PET layer, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or even at least about 5.0 wt. %. According to still other embodiments, the second flame retardant PET layer 130 may include a Flame retardant filler component content of not greater than about 10.0 wt. % for a total weight of the first flame retardant PET layer, such as, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. %. It will be appreciated that the Flame retardant filler component content of the second flame retardant PET layer 130 may be within a range between any of the minimum and maximum values noted above. It will be further appreciated that the Flame retardant filler component content of the second flame retardant PET layer 130 may be any value between any of the minimum and maximum values noted above.

According to yet other embodiments, the second flame retardant PET layer 130 may have a V-0 rating as measured according to UL94 flammability test.

According to still other embodiments, the second flame retardant PET layer 130 may have a particular thickness. For example, the second flame retardant PET layer 130 may have a thickness of at least about 5 microns, such as, at least about 10 microns or at least about 20 microns or at least about 30 microns or at least about 40 microns or at least about 50 microns or even at least about 100 microns. According to still other embodiments, the first anti-microbial coating 120 may have an thickness of not greater than about 400 microns, such as, not greater than about 375 microns or not greater than about 350 microns or not greater than about 325 microns or not greater than about 300 microns or not greater than about 275 microns or not greater than about 250 microns or not greater than about 225 microns or even not greater than about 200. It will be appreciated that the average thickness of the second flame retardant PET layer 130 may be within a range between any of the minimum and maximum values noted above. It will be further appreciated that the average thickness of the second flame retardant PET layer 130 may be any value between any of the minimum and maximum values noted above.

Figure 2:
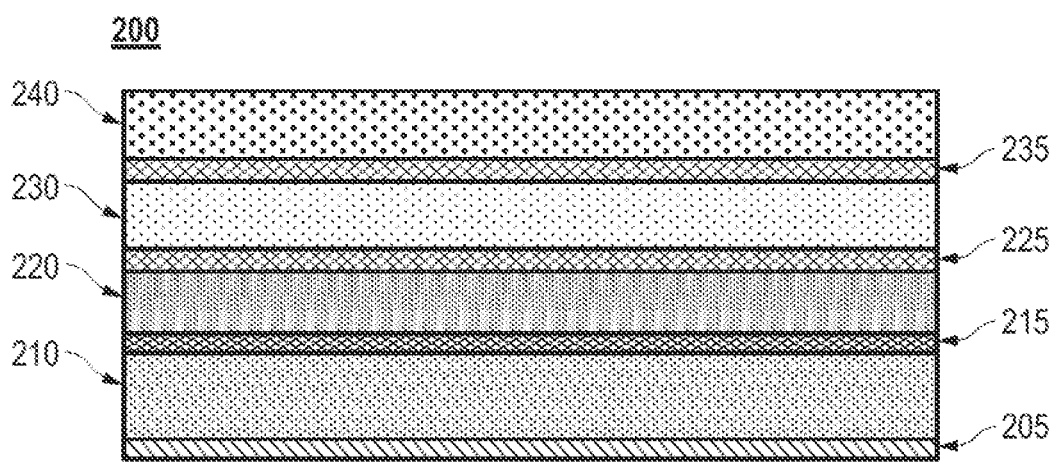
FIG. 2 includes an illustration of a multilayer protective film according to embodiments described herein.

For purposes of further illustration, FIG. 2 includes an illustration of another multilayer protective film 200 according to additional embodiments described herein. As shown in FIG. 2, a multilayer protective film 200 may include a structural PET layer 210, a first removable adhesive layer 205 underlying the structural PET layer 210, a first peelable adhesive layer 215 overlying the structural PET layer 210, a first flame retardant PET layer 220 overlying the first peelable adhesive layer 215, a second peelable adhesive layer 225 overlying the first flame retardant PET layer 220, a second flame retardant PET layer 230 overlying the second peelable adhesive layer 225, a third peelable adhesive layer 235 overlying the second flame retardant PET layer 230, and a third flame retardant PET layer 240 overlying the third peelable adhesive layer 235.

It will be appreciated that the multilayer protective film 200 and all components described in reference to the multilayer protective film 200 as shown in FIG. 2 may have any of the characteristics described herein with reference to corresponding components in FIG. 1.

According to still other embodiments, the third peelable adhesive layer 235 may include particular materials. For example, the third peelable adhesive layer 235 may include a non-permanent adhesive, an acrylic-based adhesive, a silicone-based adhesive, a semi-permanent pressure sensitive adhesive, and combinations thereof. According to still other embodiments, the third peelable adhesive layer 235 may consist essentially of particular materials. For example, the third peelable adhesive layer 235 may consist essentially of a non-permanent adhesive, an acrylic-based adhesive, a silicone-based adhesive, a semi-permanent pressure sensitive adhesive, and combinations thereof.

According to still other embodiments, the third peelable adhesive layer 235 may have a particular thickness. For example, the third peelable adhesive layer 235 may have a thickness of at least about 3 microns, such as, at least about 4 microns or at least about 5 microns or at least about 10 microns or at least about 15 microns or at least about 20 microns or even at least about 25 microns. According to yet other embodiments, the third peelable adhesive layer 235 may have a thickness of not greater than about 50 microns, such as, not greater than about 45 microns or not greater than about 40 microns or not greater than about 35 microns or not greater than about 30 microns or even not greater than about 25 microns. It will be appreciated that the thickness of the third peelable adhesive layer 235 may be within a range between any of the minimum and maximum values noted above. It will be further appreciated that the thickness of the third peelable adhesive layer 235 may be any value between any of the minimum and maximum values noted above.

According to still other embodiments, the third peelable adhesive layer 235 may have a particular peel strength (between itself and any other layer) as measured according to ASTM D903-98 in a 180 degree peel. According to particular embodiments, the third peelable adhesive layer 235 may have a peel strength of at least about 25 g/in, such as, at least about 30 g/in or at least about 35 g/in or at least about 40 g/in or at least about 50 g/in or at least about 100 g/in or at least about 200 g/in or at least about 300 g/in or at least about 400 g/in or even at least about 500 Win. According to still other embodiments, the third peelable adhesive layer 235 may have a peel strength of not greater than about 1000 g/in, such as, not greater than about 950 g/in or not greater than about 900 g/in or not greater than about 850 g/in or not greater than about 800 g/in. It will be appreciated that the peel strength of third peelable adhesive layer 235 of the multilayered protective film 100 may be within a range between any of the minimum and maximum values noted above. It will be further appreciated that the peel strength of the third peelable adhesive layer 235 of the multilayered protective film 100 may be any value between any of the minimum and maximum values noted above.

According to still other embodiments, the third flame retardant PET layer 240 may include a PET base material and a flame retardant filler component within the PET base material.

According to still other embodiments, the third flame retardant PET layer 240 may include a particular content of the PET base material. For example, the third flame retardant PET layer 240 may include a PET base material content of at least about 90 wt. % for a total weight of the first flame retardant PET layer, such as, at least about 90.5 wt. % or at least about 91 wt. % or at least about 91.5 wt. % or at least about 92.0 wt. % or at least about 92.5 wt. % or at least about 93.0 wt. % or at least about 93.5 wt. % or at least about 94.0 wt. % or at least about 94.5 wt. % or even at least about 95.0 wt. %. According to still other embodiments, the third flame retardant PET layer 240 may include a PET base material content of not greater than about 99.9 wt. % for a total weight of the first flame retardant PET layer, such as, not greater than about 99.5 wt. % or not greater than about 99.0 wt. % or not greater than about 98.5 wt. % or not greater than about 98.0 wt. % or not greater than about 97.5 wt. % or not greater than about 97.0 wt. % or not greater than about 96.5 wt. % or not greater than about 9.0 wt. %. It will be appreciated that the PET base material content of the third flame retardant PET layer 240 may be within a range between any of the minimum and maximum values noted above. It will be further appreciated that the PET base material content of the third flame retardant PET layer 240 may be any value between any of the minimum and maximum values noted above.

According to still other embodiments, the third flame retardant PET layer 240 may include a particular content of the PET base material. For example, the third flame retardant PET layer 240 may include a Flame retardant filler component content of at least about 0.1 wt. % for a total weight of the first flame retardant PET layer, such as, at least about 0.5 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or even at least about 5.0 wt. %. According to still other embodiments, the third flame retardant PET layer 240 may include a Flame retardant filler component content of not greater than about 10.0 wt. % for a total weight of the first flame retardant PET layer, such as, not greater than about 9.5 wt. % or not greater than about 9.0 wt. % or not greater than about 8.5 wt. % or not greater than about 8.0 wt. % or not greater than about 7.5 wt. % or not greater than about 7.0 wt. % or not greater than about 6.5 wt. % or not greater than about 6.0 wt. %. It will be appreciated that the Flame retardant filler component content of the third flame retardant PET layer 240 may be within a range between any of the minimum and maximum values noted above. It will be further appreciated that the Flame retardant filler component content of the third flame retardant PET layer 240 may be any value between any of the minimum and maximum values noted above.

According to yet other embodiments, the third flame retardant PET layer 240 may have a V-0 rating as measured according to UL94 flammability test.

According to still other embodiments, the third flame retardant PET layer 240 may have a particular thickness. For example, the third flame retardant PET layer 240 may have a thickness of at least about 5 microns, such as, at least about 10 microns or at least about 20 microns or at least about 30 microns or at least about 40 microns or at least about 50 microns or even at least about 100 microns. According to still other embodiments, the first anti-microbial coating 120 may have an thickness of not greater than about 400 microns, such as, not greater than about 375 microns or not greater than about 350 microns or not greater than about 325 microns or not greater than about 300 microns or not greater than about 275 microns or not greater than about 250 microns or not greater than about 225 microns or even not greater than about 200. It will be appreciated that the average thickness of the third flame retardant PET layer 240 may be within a range between any of the minimum and maximum values noted above. It will be further appreciated that the average thickness of the third flame retardant PET layer 240 may be any value between any of the minimum and maximum values noted above.

Figure 3:
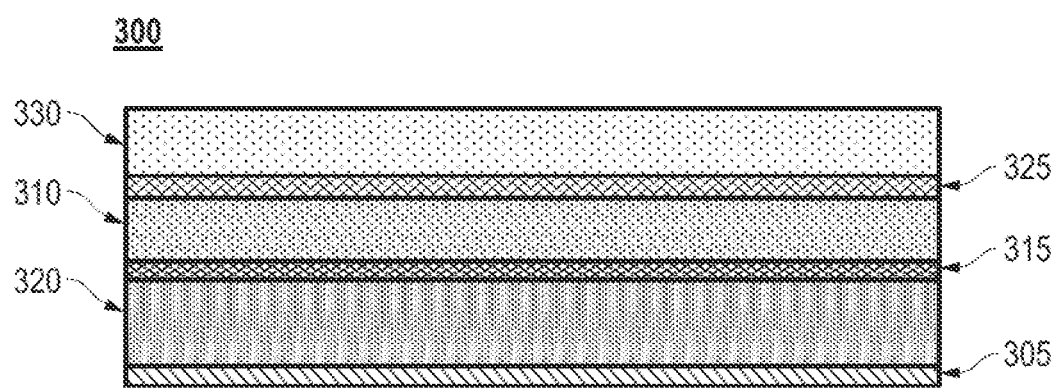
FIG. 3 includes an illustration of a multilayer protective film according to embodiments described herein.

For purposes of further illustration, FIG. 3 includes an illustration of a multilayer protective film 300 according to another embodiment described herein. As shown in FIG. 3, a multilayer protective film 300 may include a first flame retardant PET layer 320, a first removable adhesive layer 305 underlying the first flame retardant PET layer 320, a first peelable adhesive layer 315 overlying the first flame retardant PET layer 320, a structural PET layer 310 overlying the first peelable adhesive layer 315, a second peelable adhesive layer 325 overlying the structural PET layer 310, and a second flame retardant PET layer 330 overlying the second peelable adhesive layer 325.

It will be appreciated that the multilayer protective film 300 and all components described in reference to the multilayer protective film 300 as shown in FIG. 3 may have any of the characteristics described herein with reference to corresponding components in FIG. 1.

Figure 4:
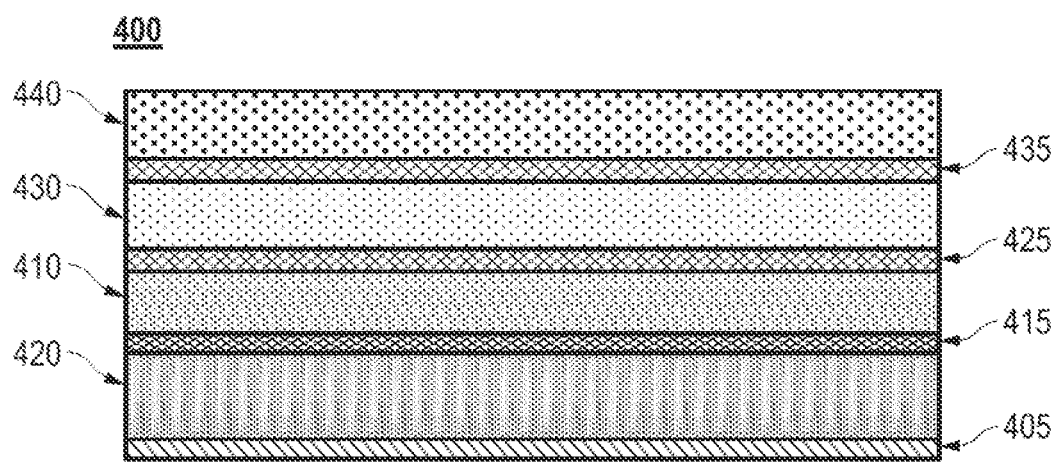
FIG. 4 includes an illustration of a multilayer protective film according to embodiments described herein.

For purposes of further illustration, FIG. 4 includes an illustration of a multilayer protective film 400 according to another embodiment described herein. As shown in FIG. 4, a multilayer protective film 400 may include a first flame retardant PET layer 420, a first removable adhesive layer 405 underlying the first flame retardant PET layer 420, a first peelable adhesive layer 415 overlying the first flame retardant PET layer 420, a structural PET layer 410 overlying the first peelable adhesive layer 415, a second peelable adhesive layer 425 overlying the structural PET layer 410, a second flame retardant PET layer 430 overlying the second peelable adhesive layer 425, a third peelable adhesive layer 435 overlying the second flame retardant PET layer 430, and a third flame retardant PET layer 440 overlying the third peelable adhesive layer 435.

It will be appreciated that the multilayer protective film 400 and all components described in reference to the multilayer protective film 400 as shown in FIG. 4 may have any of the characteristics described herein with reference to corresponding components in FIGS. 1 and 2.

Figure 5:
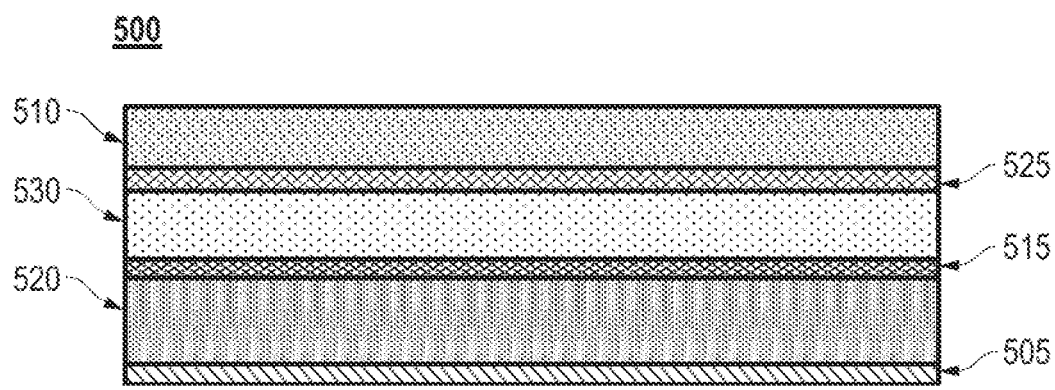
FIG. 5 includes an illustration of a multilayer protective film according to embodiments described herein.

For purposes of further illustration, FIG. 5 includes an illustration of a multilayer protective film 500 according to another embodiment described herein. As shown in FIG. 5, a multilayer protective film 500 may include a first flame retardant PET layer 520, a first removable adhesive layer 505 underlying the first flame retardant PET layer 520, a first peelable adhesive layer 515 overlying the first flame retardant PET layer 520, a second flame retardant PET layer 530 overlying the first peelable adhesive layer 515, a second peelable adhesive layer 525 overlying the second flame retardant PET layer 530, and a structural PET layer 510 overlying the second peelable adhesive layer 525.

It will be appreciated that the multilayer protective film 500 and all components described in reference to the multilayer protective film 500 as shown in FIG. 5 may have any of the characteristics described herein with reference to corresponding components in FIG. 1.

Figure 6:
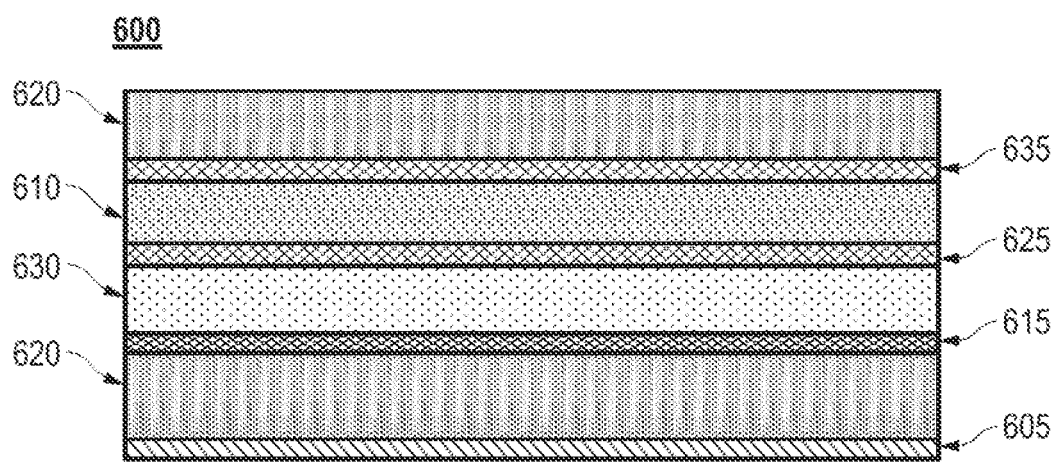
FIG. 6 includes an illustration of a multilayer protective film according to embodiments described herein.

For purposes of further illustration, FIG. 6 includes an illustration of a multilayer protective film 600 according to another embodiment described herein. As shown in FIG. 6, a multilayer protective film 600 may include a multilayer protective film 600 may include a first flame retardant PET layer 620, a first removable adhesive layer 605 underlying the first flame retardant PET layer 620, a first peelable adhesive layer 615 overlying the first flame retardant PET layer 620, a second flame retardant PET layer 630 overlying the first peelable adhesive layer 615, a second peelable adhesive layer 625 overlying the second flame retardant PET layer 630, a structural PET layer 610 overlying the second peelable adhesive layer 625, a third peelable adhesive layer 635 overlying the structural PET layer 610, and a third flame retardant PET layer 620 overlying the third peelable adhesive layer 635.

It will be appreciated that the multilayer protective film 600 and all components described in reference to the multilayer protective film 600 as shown in FIG. 6 may have any of the characteristics described herein with reference to corresponding components in FIGS. 1 and 2.

Turning now to methods of forming a multilayer protective film according to embodiments described herein, it will be appreciated that the films may be formed by any forming method that applies the adhesive layers to the PET layers (whether structural or flame retardant) in the constructions shown in FIGS. 1-6.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A multilayer protective film comprising: a structural PET layer; a first removable adhesive layer underlying the structural PET layer; a first peelable adhesive layer overlying the structural PET layer; a first flame retardant PET layer overlying the first peelable adhesive layer; a second peelable adhesive layer overlying the first flame retardant PET layer; and a second flame retardant PET layer overlying the second peelable adhesive layer, wherein the multilayer protective film has a lateral flame spread of greater than about 20 KW/m$^2$, wherein the multilayer protective film has a specific optical density (Ds[4]) of not greater than about 300 as tested by ISO 5659-2, and wherein the multilayer protective film has a cumulative specific optical density (VOF$_4$) of not greater than about 600 as tested by ISO 5659-2.

Embodiment 2. A multilayer protective film comprising: a first flame retardant PET layer; a first removable adhesive layer underlying the first flame retardant PET layer; a first peelable adhesive layer overlying the first flame retardant PET layer; a structural PET layer overlying the first peelable adhesive layer; a second peelable adhesive layer overlying the structural PET layer; and a second flame retardant PET layer overlying the second peelable adhesive layer, wherein the multilayer protective film has a lateral flame spread of greater than about 20 KW/m$^2$, wherein the multilayer protective film has a specific optical density (Ds[4]) of not greater than about 300 as tested by ISO 5659-2, and wherein the multilayer protective film has a cumulative specific optical density (VOF$_4$) of not greater than about 600 as tested by ISO 5659-2.

Embodiment 3. A multilayer protective film comprising: a first flame retardant PET layer; a first removable adhesive layer underlying the first flame retardant PET layer; a first peelable adhesive layer overlying the first flame retardant PET layer; a second flame retardant PET layer overlying the first peelable adhesive layer, a second peelable adhesive layer overlying the second flame retardant PET layer; and a structural PET layer overlying the second peelable adhesive layer; wherein the multilayer protective film has a lateral flame spread of greater than about 20 KW/m$^2$, wherein the multilayer protective film has a specific optical density (Ds[4]) of not greater than about 300 as tested by ISO 5659-2, and wherein the multilayer protective film has a cumulative specific optical density (VOF$_4$) of not greater than about 600 as tested by ISO 5659-2.

Embodiment 4. The multilayer protective film of any one of embodiments 1, 2, and 3, wherein the multilayer protective film has a VLT of at least about 88%.

Embodiment 5. The multilayer protective film of any one of embodiments 1, 2, and 3, wherein the multilayer protective film has a VLT of not greater than about 98%.

Embodiment 6. The multilayer protective film of any one of embodiments 1, 2, and 3, wherein the multilayer protective film has a haze value of at least about 0.2%.

Embodiment 7. The multilayer protective film of any one of embodiments 1, 2, and 3, wherein the multilayer protective film has a haze value of not greater than about 4%.

Embodiment 8. The multilayer protective film of any one of embodiments 1, 2, and 3, wherein the structural PET layer comprises PET.

Embodiment 9. The multilayer protective film of any one of embodiments 1, 2, and 3, wherein the structural PET layer consists of PET.

Embodiment 10. The multilayer protective film of any one of embodiments 1, 2, and 3, wherein the structural PET layer has a thickness of at least about 5 microns.

Embodiment 11. The multilayer protective film of any one of embodiments 1, 2, and 3, wherein the structural PET layer has a thickness of not greater than about 400 microns.

Embodiment 12. The multilayer protective film of any one of embodiments 1, 2, and 3, wherein the removable adhesive layer comprises an acrylic-based adhesive, a silicone-based adhesive, or any combination thereof.

Embodiment 13. The multilayer protective film of embodiment 12, wherein the first removable adhesive layer is an acrylic-based adhesive layer.

Embodiment 14. The multilayer protective film of embodiment 12, wherein the first removable adhesive layer consists of an acrylic-based adhesive.

Embodiment 15. The multilayer protective film of embodiment 12, wherein the first removable adhesive layer is a silicone-based adhesive layer.

Embodiment 16. The multilayer protective film of embodiment 12, wherein the first removable adhesive layer consists of a silicone-based adhesive.

Embodiment 17. The multilayer protective film of any one of embodiments 1, 2, and 3, wherein the first removable adhesive layer comprises a thickness of at least about 2.5 microns.

Embodiment 18. The multilayer protective film of any one of embodiments 1, 2, and 3, wherein the first removable adhesive layer comprises a thickness of not greater than about 100 microns.

Embodiment 19. The multilayer protective film of embodiment 12, wherein the first removable adhesive layer comprises a peel strength to glass of at least about 25 g/in.

Embodiment 20. The multilayer protective film of embodiment 12, wherein the first removable adhesive layer comprises a peel strength to glass of not greater than about 2500 g/in.

Embodiment 21. The multilayer protective film of embodiment 12, wherein the multilayer protective film further comprises a liner underlying the first removable adhesive layer.

Embodiment 22. The multilayer protective film of embodiment 21, wherein the liner comprises a silicone-based layer.

Embodiment 23. The multilayer protective film of embodiment 21, wherein the liner comprises an average thickness of at least about 5 microns.

Embodiment 24. The multilayer protective film of embodiment 21, wherein the liner comprises an average thickness of not greater than about 150 microns.

Embodiment 25. The multilayer protective film of any one of embodiments 1, 2, and 3, wherein the multilayer film comprises an adhesion strength between the structural PET layer and the release liner component of at least about 1 grams per inch as measure in a 180 degree peel.

Embodiment 26. The multilayer protective film of embodiment 25, wherein the multilayer film comprises an adhesion strength between the structural PET layer and the release liner component of not greater than about 45 grams per inch as measure in a 180 degree peel.

Embodiment 27. The multilayer protective film of any one of embodiments 1, 2, and 3, wherein the first flame retardant PET layer comprises a PET base material and a flame retardant filler component within the PET base material.

Embodiment 28. The multilayer protective film of embodiment 27, wherein first flame retardant PET layer comprises a PET base material concentration of at least about 90.0 wt. % for a total weight of the first flame retardant PET layer.

Embodiment 29. The multilayer protective film of embodiment 27, wherein first flame retardant PET layer comprises a PET base material concentration of not greater than about 99.9 wt. % for a total weight of the first flame retardant PET layer.

Embodiment 30. The multilayer protective film of embodiment 27, wherein first flame retardant PET layer comprises a flame retardant filler component concentration of at least about 0.1 wt. % for a total weight of the first flame retardant PET layer.

Embodiment 31. The multilayer protective film of embodiment 27, wherein first flame retardant PET layer comprises a flame retardant filler component concentration of not greater than about 10 wt. % for a total weight of the first flame retardant PET layer.

Embodiment 32. The multilayer protective film of any one of embodiments 1, 2, and 3, wherein the first flame retardant PET layer has a V-0 rating as measured according to UL94 flammability test.

Embodiment 33. The multilayer protective film of any one of embodiments 1, 2, and 3, wherein the first flame retardant PET layer has a thickness of at least about 5 microns.

Embodiment 34. The multilayer protective film of any one of embodiments 1, 2, and 3, wherein the first flame retardant PET layer has a thickness of not greater than about 400 microns.

Embodiment 35. The multilayer protective film of any one of embodiments 1, 2, and 3, wherein the first peelable adhesive layer comprises a non-permanent adhesive, an acrylic-based adhesive, a silicone-based adhesive, a semi-permanent pressure sensitive adhesive, and combinations thereof.

Embodiment 36. The multilayer protective film of any one of embodiments 1, 2, and 3, wherein the first peelable adhesive layer has a thickness of at least about 3 microns.

Embodiment 37. The multilayer protective film of embodiment 36, wherein the first peelable adhesive layer has a thickness of not greater than about 50 microns.

Embodiment 38. The multilayer protective film of any one of embodiments 1, 2, and 3, wherein the multilayer film comprises an adhesion strength between the first flame retardant PET layer and the structural PET layer of at least about 25 grams per inch as measure in a 180 degree peel.

Embodiment 39. The multilayer protective film of embodiment 38, wherein the multilayer film comprises an adhesion strength between the first flame retardant PET layer and the structural PET layer of not greater than about 1000 grams per inch as measure in a 180 degree peel.

Embodiment 40. The multilayer protective film of any one of embodiments 1, 2, and 3, wherein the second peelable adhesive layer comprises a non-permanent adhesive, an acrylic-based adhesive, a silicone-based adhesive, a semi-permanent pressure sensitive adhesive, and combinations thereof.

Embodiment 41. The multilayer protective film of any one of embodiments 1, 2, and 3, wherein the second peelable adhesive layer has a thickness of at least about 3 microns.

Embodiment 42. The multilayer protective film of embodiment 41, wherein the second peelable adhesive layer has a thickness of not greater than about 50 microns.

Embodiment 43. The multilayer protective film of any one of embodiments 1, 2, and 3, wherein the second flame retardant PET layer comprises a PET base material and a flame retardant filler component within the PET base material.

Embodiment 44. The multilayer protective film of embodiment 43, wherein second flame retardant PET layer comprises a PET base material concentration of at least about 90.0 wt. % for a total weight of the second flame retardant PET layer.

Embodiment 45. The multilayer protective film of embodiment 43, wherein second flame retardant PET layer comprises a PET base material concentration of not greater than about 99.9 wt. % for a total weight of the second flame retardant PET layer.

Embodiment 46. The multilayer protective film of embodiment 43, wherein second flame retardant PET layer comprises a flame retardant filler component concentration of at least about 0.1 wt. % for a total weight of the second flame retardant PET layer.

Embodiment 47. The multilayer protective film of embodiment 43, wherein second flame retardant PET layer comprises a flame retardant filler component concentration of not greater than about 10 wt. % for a total weight of the second flame retardant PET layer.

Embodiment 48. The multilayer protective film of any one of embodiments 1, 2, and 3, wherein the second flame retardant PET layer has a V-0 rating as measured according to UL94 flammability test.

Embodiment 49. The multilayer protective film of any one of embodiments 1, 2, and 3, wherein the second flame retardant PET layer has a thickness of at least about 5 microns.

Embodiment 50. The multilayer protective film of any one of embodiments 1, 2, and 3, wherein the second flame retardant PET layer has a thickness of not greater than about 400 microns.

Embodiment 51. The multilayer protective film of any one of embodiments 1, 2, and 3, wherein the second peelable adhesive layer comprises a non-permanent adhesive, an acrylic-based adhesive, a silicone-based adhesive, a semi-permanent pressure sensitive adhesive, and combinations thereof.

Embodiment 52. The multilayer protective film of any one of embodiments 1, 2, and 3, wherein the second peelable adhesive layer has a thickness of at least about 3 microns.

Embodiment 53. The multilayer protective film of embodiment 52, wherein the second peelable adhesive layer has a thickness of not greater than about 50 microns.

Embodiment 54. The multilayer protective film of any one of embodiments 1, 2, and 3, wherein the multilayer film comprises an adhesion strength between the second flame retardant PET layer and the first flame retardant PET layer of at least about 25 grams per inch as measure in a 180 degree peel.

Embodiment 55. The multilayer protective film of embodiment 54, wherein the multilayer film comprises an adhesion strength between the second flame retardant PET layer and the first flame retardant PET film of not greater than about 1000 grams per inch as measure in a 180 degree peel.

Embodiment 56. The multilayer protective film of any one of embodiments 1 and 2, the multilayer film further comprises a third peelable adhesive overlying the second flame retardant PET layer and a third flame retardant PET film overlying the third peelable adhesive.

Embodiment 57. The multilayer protective film of embodiment 3, the multilayer film further comprises a third peelable adhesive overlying the structural PET layer and a third flame retardant PET film overlying the third peelable adhesive.

Embodiment 58. The multilayer protective film of any one of embodiments 56 and 57, wherein the third peelable adhesive layer comprises a non-permanent adhesive, an acrylic-based adhesive, a silicone-based adhesive, a semi-permanent pressure sensitive adhesive, and combinations thereof.

Embodiment 59. The multilayer protective film of any one of embodiments 56 and 57, wherein the third peelable adhesive layer has a thickness of at least about 3 microns.

Embodiment 60. The multilayer protective film of embodiment 59, wherein the third peelable adhesive layer has a thickness of not greater than about 50 microns.

Embodiment 61. The multilayer protective film of any one of embodiments 56 and 57, wherein the third flame retardant PET layer comprises a PET base material and a flame retardant filler component within the PET base material.

Embodiment 62. The multilayer protective film of embodiment 61, wherein third flame retardant PET layer comprises a PET base material concentration of at least about 90 wt. % for a total weight of the third flame retardant PET layer.

Embodiment 63. The multilayer protective film of embodiment 61, wherein third flame retardant PET layer comprises a PET base material concentration of not greater than about 99.9 wt. % for a total weight of the third flame retardant PET layer.

Embodiment 64. The multilayer protective film of embodiment 61, wherein third flame retardant PET layer comprises a flame retardant filler component concentration of at least about 0.1 wt. % for a total weight of the third flame retardant PET layer.

Embodiment 65. The multilayer protective film of embodiment 61, wherein third flame retardant PET layer comprises a flame retardant filler component concentration of not greater than about 10 wt. % for a total weight of the third flame retardant PET layer.

Embodiment 66. The multilayer protective film of any one of embodiments 56 and 57, wherein the third flame retardant PET layer has a V-0 rating as measured according to UL94 flammability test.

Embodiment 67. The multilayer protective film of any one of embodiments 56 and 57, wherein the third flame retardant PET layer has a thickness of at least about 5 microns.

Embodiment 68. The multilayer protective film of embodiment 67, wherein the third flame retardant PET layer has a thickness of not greater than about 400 microns.

Embodiment 69. The multilayer protective film of any one of embodiments 56 and 57, wherein the third peelable adhesive layer comprises a non-permanent adhesive, an acrylic-based adhesive, a silicone-based adhesive, a semi-permanent pressure sensitive adhesive, and combinations thereof.

Embodiment 70. The multilayer protective film of any one of embodiments 56 and 57, wherein the third peelable adhesive layer has a thickness of at least about 3 microns.

Embodiment 71. The multilayer protective film of embodiment 70, wherein the third peelable adhesive layer has a thickness of not greater than about 50 microns.

Embodiment 72. The multilayer protective film of any one of embodiments 56 and 57, wherein the multilayer film comprises an adhesion strength between the third flame retardant PET layer and the first flame retardant PET layer of at least about 25 grams per inch as measure in a 180 degree peel.

Embodiment 73. The multilayer protective film of embodiment 72, wherein the multilayer film comprises an adhesion strength between the third flame retardant PET layer and the first flame retardant PET film of not greater than about 1000 grams per inch as measure in a 180 degree peel.

Embodiment 74. A method of forming a multilayered film, wherein the method comprises: providing a structural PET layer; forming a first removable adhesive layer underlying the structural PET layer; forming a first peelable adhesive layer overlying the structural PET layer; providing a first flame retardant PET layer overlying the first peelable adhesive layer; forming a second peelable adhesive layer overlying the first PET layer; and providing a second flame retardant PET layer overlying the second peelable adhesive layer, wherein the multilayer protective film has a lateral flame spread of greater than about 20 KW/m$^2$, wherein the multilayer protective film has a specific optical density (Ds[4]) of not greater than about 300 as tested by ISO 5659-2, and wherein the multilayer protective film has a cumulative specific optical density (VOF$_4$) of not greater than about 600 as tested by ISO 5659-2.

Embodiment 75. A method of forming a multilayered film, wherein the method comprises: providing a first flame retardant PET layer; forming a first removable adhesive layer underlying the first flame retardant PET layer; forming a first peelable adhesive layer overlying the first flame retardant PET layer; providing a structural PET layer overlying the first peelable adhesive layer; forming a second peelable adhesive layer overlying the structural PET layer; and providing a second flame retardant PET layer overlying the second peelable adhesive layer, wherein the multilayer protective film has a lateral flame spread of greater than about 20 KW/m$^2$, wherein the multilayer protective film has a specific optical density (Ds[4]) of not greater than about 300 as tested by ISO 5659-2, and wherein the multilayer protective film has a cumulative specific optical density (VOF$_4$) of not greater than about 600 as tested by ISO 5659-2.

Embodiment 76. A method of forming a multilayered film, wherein the method comprises: providing a first flame retardant PET layer; forming a first removable adhesive layer underlying the first flame retardant PET layer; forming a first peelable adhesive layer overlying the first flame retardant PET layer; providing a second flame retardant PET layer overlying the first peelable adhesive layer, forming a second peelable adhesive layer overlying the second flame retardant PET layer; and providing a structural PET layer overlying the second peelable adhesive layer; wherein the multilayer protective film has a lateral flame spread of greater than about 20 KW/m$^2$, wherein the multilayer protective film has a specific optical density (Ds[4]) of not greater than about 300 as tested by ISO 5659-2, and wherein the multilayer protective film has a cumulative specific optical density (VOF$_4$) of not greater than about 600 as tested by ISO 5659-2.

Embodiment 77. The method of any one of embodiments 74, 75, and 76, wherein the multilayer protective film has a VLT of at least about 88%.

Embodiment 78. The method of any one of embodiments 74, 75, and 76, wherein the multilayer protective film has a VLT of not greater than about 98%.

Embodiment 79. The method of any one of embodiments 74, 75, and 76, wherein the multilayer protective film has a haze value of at least about 0.2%.

Embodiment 80. The method of any one of embodiments 74, 75, and 76, wherein the multilayer protective film has a haze value of not greater than about 4%.

Embodiment 81. The method of any one of embodiments 74, 75, and 76, wherein the structural PET layer comprises PET.

Embodiment 82. The method of any one of embodiments 74, 75, and 76, wherein the structural PET layer consists of PET.

Embodiment 83. The method of any one of embodiments 74, 75, and 76, wherein the structural PET layer has a thickness of at least about 5 microns.

Embodiment 84. The method of any one of embodiments 74, 75, and 76, wherein the structural PET layer has a thickness of not greater than about 400 microns.

Embodiment 85. The method of any one of embodiments 74, 75, and 76, wherein the removable adhesive layer comprises an acrylic-based adhesive, a silicone-based adhesive, or any combination thereof.

Embodiment 86. The method of embodiment 85, wherein the first removable adhesive layer is an acrylic-based adhesive layer.

Embodiment 87. The method of embodiment 85, wherein the first removable adhesive layer consists of an acrylic-based adhesive.

Embodiment 88. The method of embodiment 85, wherein the first removable adhesive layer is a silicone-based adhesive layer.

Embodiment 89. The method of embodiment 85, wherein the first removable adhesive layer consists of a silicone-based adhesive.

Embodiment 90. The method of any one of embodiments 74, 75, and 76, wherein the first removable adhesive layer comprises a thickness of at least about 2.5 microns.

Embodiment 91. The method of any one of embodiments 74, 75, and 76, wherein the first removable adhesive layer comprises a thickness of not greater than about 100 microns.

Embodiment 92. The method of embodiment 85, wherein the first removable adhesive layer comprises a peel strength of at least about 25 g/in.

Embodiment 93. The method of embodiment 85, wherein the first removable adhesive layer comprises a peel strength of not greater than about 2500 g/in.

Embodiment 94. The method of embodiment 85, wherein the multilayer protective film further comprises a liner underlying the first removable adhesive layer.

Embodiment 95. The method of embodiment 94, wherein the liner comprises a silicone-based layer.

Embodiment 96. The method of embodiment 94, wherein the liner comprises an average thickness of at least about 5 microns.

Embodiment 97. The method of embodiment 94, wherein the liner comprises an average thickness of not greater than about 150 microns.

Embodiment 98. The method of any one of embodiments 74, 75, and 76, wherein the multilayer film comprises an adhesion strength between the structural PET layer and the release liner component of at least about 1 grams per inch as measure in a 180 degree peel.

Embodiment 99. The method of embodiment 98, wherein the multilayer film comprises an adhesion strength between the structural PET layer and the release liner component of not greater than about 45 grams per inch as measure in a 180 degree peel.

Embodiment 100. The method of any one of embodiments 74, 75, and 76, wherein the first flame retardant PET layer comprises PET base material and a flame retardant filler component within the PET base material.

Embodiment 101. The method of embodiment 100, wherein first flame retardant PET layer comprises a PET base material concentration of at least about 90.0 wt. % for a total weight of the first flame retardant PET layer.

Embodiment 102. The method of embodiment 100, wherein first flame retardant PET layer comprises a PET base material concentration of not greater than about 99.9 wt. % for a total weight of the first flame retardant PET layer.

Embodiment 103. The method of embodiment 100, wherein first flame retardant PET layer comprises a flame retardant filler component concentration of at least about 0.1 wt. % for a total weight of the first flame retardant PET layer.

Embodiment 104. The method of embodiment 100, wherein first flame retardant PET layer comprises a flame retardant filler component concentration of not greater than about 10 wt. % for a total weight of the first flame retardant PET layer.

Embodiment 105. The method of any one of embodiments 74, 75, and 76, wherein the first flame retardant PET layer has a V-0 rating as measured according to UL94 flammability test.

Embodiment 106. The method of any one of embodiments 74, 75, and 76, wherein the first flame retardant PET layer has a thickness of at least about 5 microns.

Embodiment 107. The method of any one of embodiments 74, 75, and 76, wherein the first flame retardant PET layer has a thickness of not greater than about 400 microns.

Embodiment 108. The method of any one of embodiments 74, 75, and 76, wherein the first peelable adhesive layer comprises a non-permanent adhesive, an acrylic-based adhesive, a silicone-based adhesive, a semi-permanent pressure sensitive adhesive, and combinations thereof.

Embodiment 109. The method of any one of embodiments 74, 75, and 76, wherein the first peelable adhesive layer has a thickness of at least about 3 microns.

Embodiment 110. The multilayer protective film or method of embodiment 109, wherein the first peelable adhesive layer has a thickness of not greater than about 30 microns.

Embodiment 111. The method of any one of embodiments 74, 75, and 76, wherein the multilayer film comprises an adhesion strength between the first flame retardant PET layer and the structural PET layer of at least about 25 grams per inch as measure in a 180 degree peel.

Embodiment 112. The method of embodiment 111, wherein the multilayer film comprises an adhesion strength between the first flame retardant PET layer and the structural PET layer of not greater than about 1000 grams per inch as measure in a 180 degree peel.

Embodiment 113. The method of any one of embodiments 74, 75, and 76, wherein the second peelable adhesive layer comprises a non-permanent adhesive, an acrylic-based adhesive, a silicone-based adhesive, a semi-permanent pressure sensitive adhesive, and combinations thereof.

Embodiment 114. The method of any one of embodiments 74, 75, and 76, wherein the second peelable adhesive layer has a thickness of at least about 3 microns.

Embodiment 115. The method of embodiment 114, wherein the second peelable adhesive layer has a thickness of not greater than about 50 microns.

Embodiment 116. The method of any one of embodiments 74, 75, and 76, wherein the second flame retardant PET layer comprises a PET base material and a flame retardant filler component within the PET base material.

Embodiment 117. The method of embodiment 116, wherein second flame retardant PET layer comprises a PET base material concentration of at least about 90.0 wt. % for a total weight of the second flame retardant PET layer.

Embodiment 118. The method of embodiment 116, wherein second flame retardant PET layer comprises a PET base material concentration of not greater than about 99.9 wt. % for a total weight of the second flame retardant PET layer.

Embodiment 119. The method of embodiment 116, wherein second flame retardant PET layer comprises a flame retardant filler component concentration of at least about 0.1 wt. % for a total weight of the second flame retardant PET layer.

Embodiment 120. The method of embodiment 116, wherein second flame retardant PET layer comprises a flame retardant filler component concentration of not greater than about 10 wt. % for a total weight of the second flame retardant PET layer.

Embodiment 121. The method of any one of embodiments 74, 75, and 76, wherein the second flame retardant PET layer has a V-0 rating as measured according to UL94 flammability test.

Embodiment 122. The method of any one of embodiments 74, 75, and 76, wherein the second flame retardant PET layer has a thickness of at least about 5 microns.

Embodiment 123. The method of any one of embodiments 74, 75, and 76, wherein the second flame retardant PET layer has a thickness of not greater than about 400 microns.

Embodiment 124. The method of any one of embodiments 74, 75, and 76, wherein the second peelable adhesive layer comprises a non-permanent adhesive, an acrylic-based adhesive, a silicone-based adhesive, a semi-permanent pressure sensitive adhesive, and combinations thereof.

Embodiment 125. The method of any one of embodiments 74, 75, and 76, wherein the second peelable adhesive layer has a thickness of at least about 3 microns.

Embodiment 126. The method of embodiment 125, wherein the second peelable adhesive layer has a thickness of not greater than about 50 microns.

Embodiment 127. The method of any one of embodiments 74, 75, and 76, wherein the multilayer film comprises an adhesion strength between the second flame retardant PET layer and the first flame retardant PET layer of at least about 25 grams per inch as measure in a 180 degree peel.

Embodiment 128. The method of embodiment 127, wherein the multilayer film comprises an adhesion strength between the second flame retardant PET layer and the first flame retardant PET film of not greater than about 1000 grams per inch as measure in a 180 degree peel.

Embodiment 129. The method of any one of embodiments 74 and 75, the multilayer film further comprises a third peelable adhesive overlying the second flame retardant PET layer and a third flame retardant PET film overlying the third peelable adhesive.

Embodiment 130. The method of embodiment 76, the multilayer film further comprises a third peelable adhesive overlying the structural PET layer and a third flame retardant PET film overlying the third peelable adhesive.

Embodiment 131. The method of embodiment 129, wherein the third peelable adhesive layer comprises a non-permanent adhesive, an acrylic-based adhesive, a silicone-based adhesive, a semi-permanent pressure sensitive adhesive, and combinations thereof.

Embodiment 132. The method of embodiment 129, wherein the third peelable adhesive layer has a thickness of at least about 3 microns.

Embodiment 133. The method of embodiment 129, wherein the third peelable adhesive layer has a thickness of not greater than about 50 microns.

Embodiment 134. The method of embodiment 129, wherein the third flame retardant PET layer comprises a PET base material and a flame retardant filler component within the PET base material.

Embodiment 135. The method of embodiment 134, wherein third flame retardant PET layer comprises a PET base material concentration of at least about 90 wt. % for a total weight of the third flame retardant PET layer.

Embodiment 136. The method of embodiment 134, wherein third flame retardant PET layer comprises a PET base material concentration of not greater than about 99.9 wt. % for a total weight of the third flame retardant PET layer.

Embodiment 137. The method of embodiment 134, wherein third flame retardant PET layer comprises a flame retardant filler component concentration of at least about 0.1 wt. % for a total weight of the third flame retardant PET layer.

Embodiment 138. The method of embodiment 134, wherein third flame retardant PET layer comprises a flame retardant filler component concentration of not greater than about 10 wt. % for a total weight of the third flame retardant PET layer.

Embodiment 139. The method of embodiment 129, wherein the third flame retardant PET layer has a V-0 rating as measured according to UL94 flammability test.

Embodiment 140. The method of embodiment 129, wherein the third flame retardant PET layer has a thickness of at least about 5 microns.

Embodiment 141. The method of embodiment 129, wherein the third flame retardant PET layer has a thickness of not greater than about 400 microns.

Embodiment 142. The method of embodiment 129, wherein the third peelable adhesive layer comprises a non-permanent adhesive, an acrylic-based adhesive, a silicone-based adhesive, a semi-permanent pressure sensitive adhesive, and combinations thereof.

Embodiment 143. The method of embodiment 129, wherein the third peelable adhesive layer has a thickness of at least about 3 microns.

Embodiment 144. The method of embodiment 143, wherein the third peelable adhesive layer has a thickness of not greater than about 30 microns.

Embodiment 145. The method of embodiment 129, wherein the multilayer film comprises an adhesion strength between the third flame retardant PET layer and the first flame retardant PET layer of at least about 25 grams per inch as measure in a 180 degree peel.

Embodiment 146. The method of embodiment 145, wherein the multilayer film comprises an adhesion strength between the third flame retardant PET layer and the first flame retardant PET film of not greater than about 1000 grams per inch as measure in a 180 degree peel.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A multilayer protective film comprising:
a structural polyethylene terephthalate (PET) layer;
a first removable adhesive layer underlying the structural polyethylene terephthalate (PET) layer;
a first peelable adhesive layer overlying the structural polyethylene terephthalate (PET) layer,
a first flame retardant polyethylene terephthalate (PET) layer overlying the first peelable adhesive layer comprising a flame retardant filler;
a second peelable adhesive layer overlying the first flame retardant polyethylene terephthalate (PET) layer; and
a second flame retardant polyethylene teraphthalate layer overlying the second peelable adhesive layer,
wherein the multilayer protective film has a lateral flame spread of greater than about 20 KW/m$^2$,
wherein the multilayer protective film has a specific optical density (Ds) of not greater than about 300 as tested by ISO 5659-2 (2017), and
wherein the multilayer protective film has a cumulative specific optical density (VOF$_4$) of not greater than about 600 as tested by ISO 5659-2 (2017).

2. The multilayer protective film of claim 1, wherein the multilayer protective film has a visible light transmission (VLT) of at least about 88% and not greater than about 98%.

3. The multilayer protective film of claim 1, wherein the multilayer protective film has a haze value of at least about 0.2% and not greater than about 4%.

4. The multilayer protective film of claim 1, wherein the structural polyethylene terephthalate (PET) layer comprises polyethylene terephthalate (PET).

5. The multilayer protective film of claim 1, wherein the structural polyethylene teraphthalate (PET) layer consists of polyethylene terephthalate (PET).

6. The multilayer protective film of claim 1, wherein the structural polyethylene terephthalate (PET) layer has a thickness of at least about 5 microns.

7. The multilayer protective film of claim 1, wherein the structural polyethylene terephthalate (PET) layer has a thickness of not greater than about 400 microns.

8. The multilayer protective film of claim 7, wherein the multilayer protective film further comprises a liner underlying the first removable adhesive layer.

9. The multilayer protective film of claim 8, wherein the liner comprises a silicone-based layer.

10. The multilayer protective film of claim 8, wherein the liner comprises an average thickness of at least about 5 microns and not greater than about 150 microns.

11. The multilayer protective film of claim 1, wherein the removable adhesive layer comprises an acrylic-based adhesive, a silicone-based adhesive, or any combination thereof.

12. The multilayer protective film of claim 11, wherein the first removable adhesive layer comprises a peel strength to glass of at least about 25 g/in and not greater than about 2500 g/in.

13. The multilayer protective film of claim 1, wherein the first removable adhesive layer comprises a thickness of at least about 2.5 microns and not greater than about 100 microns.

14. The multilayer protective film of claim 1, wherein the first flame retardant PET layer comprises at least 90 wt % and no greater than about 99.9 wt % polyethylene terephthalate (PET) for a total weight of the layer.

15. The multilayer protective film of claim 14, wherein the first flame retardant PET layer comprises at least about 0.1 wt % and not greater than about 10.0 wt % flame retardant filler for a total weight of the layer.

16. A multilayer protective film comprising:
a first flame retardant polyethylene terephthalate (PET) layer;
a first removable adhesive layer underlying the first flame retardant polyethylene terephthalate (PET) layer;
a first peelable adhesive layer overlying the first flame retardant polyethylene terephthalate layer;
a structural polyethylene terephthalate (PET) layer overlying the first peelable adhesive layer;
a second peelable adhesive layer overlying the structural polyethylene terephthalate (PET) layer; and
a second flame retardant polyethylene terephthalate (PET) layer overlying the second peelable adhesive layer,
wherein the multilayer protective film has a lateral flame spread of greater than about 20 KW/m$^2$,
wherein the multilayer protective film has a specific optical density (Ds) of not greater than about 300 as tested by ISO 5659-2 (2017), and
wherein the multilayer protective film has a cumulative specific optical density (VOF$_4$) of not greater than about 600 as tested by ISO 5659-2 (2017).

17. The multilayer protective film of claim 16, wherein the multilayer protective film has a visible light transmission (VLT) of at least about 88% and not greater than about 98%.

18. The multilayer protective film of claim 16, wherein the multilayer protective film has a haze value of at least about 0.2% and not greater than about 4%.

19. The multilayer protective film of claim 16, wherein the structural polyethylene terephthalate (PET) layer comprises polyethylene terephthalate (PET).

20. A multilayer protective film comprising:
a first flame retardant polyethylene (PET) layer comprising a flame retardant filler container matrix rising PET;
a first removable adhesive layer underlying the first flame retardant polyethylene terephthalate (PET) layer;
a first peelable adhesive layer overlying the first flame retardant polyethylene terephthalate (PET) layer;
a second flame retardant polyethylene terephthalate (PET) layer overlying the first peelable adhesive layer,
a second peelable adhesive layer overlying the second flame retardant polyethylene terephthalate (PET) layer; and
a structural polyethylene terephthalate (PET) layer overlying the second peelable adhesive layer;
wherein the multilayer protective film has a lateral flame spread of greater than about 20 KW/m$^2$,
wherein the multilayer protective film has a specific optical density (Ds) of not greater than about 300 as tested by ISO 5659-2 (2017), and wherein the multilayer protective film has a cumulative specific optical density
(VOF$_4$) of not greater than about 600 as tested by ISO 5659-2 (2017).

* * * * *